(12) United States Patent
Michie et al.

(10) Patent No.: US 9,527,435 B2
(45) Date of Patent: Dec. 27, 2016

(54) VEHICLE ARTICLE CARRIER WITH INTEGRATED CAMERA AND SOLAR POWERED LIGHTING

(71) Applicant: JAC Products, Inc., Saline, MI (US)

(72) Inventors: Gordon Michie, Lasalle (CA); Jeffrey M. Aftanas, Ortonville, MI (US); Riley Iakovidis, Detroit, MI (US)

(73) Assignee: JAC Products, Inc., Saline, MI (US)

( * ) Notice: Subject to any disclaimer, the term of this patent is extended or adjusted under 35 U.S.C. 154(b) by 973 days.

(21) Appl. No.: 13/678,040

(22) Filed: Nov. 15, 2012

(65) Prior Publication Data

US 2013/0135880 A1    May 30, 2013

Related U.S. Application Data

(60) Provisional application No. 61/561,325, filed on Nov. 18, 2011.

(51) Int. Cl.
*B60Q 1/26* (2006.01)
*B60R 11/04* (2006.01)
*B60R 9/04* (2006.01)
*F21S 8/10* (2006.01)

(52) U.S. Cl.
CPC .......... *B60Q 1/2611* (2013.01); *B60Q 1/2661* (2013.01); *B60R 9/04* (2013.01); *B60R 11/04* (2013.01); *F21S 48/00* (2013.01)

(58) Field of Classification Search
CPC ....... B60Q 1/2611; B60Q 1/2661; B60Q 1/26; B60Q 1/06; B60Q 1/085; B60Q 1/10;B60Q 1/12; B60Q 1/2607; B60Q 1/2619; B60Q 1/48–1/486; F21S 48/00; B60R 11/04; B60R 9/04
USPC .................. 362/218, 459, 581; 224/311, 545
See application file for complete search history.

(56) References Cited

U.S. PATENT DOCUMENTS

| | | | |
|---|---|---|---|
| 4,426,028 A | 1/1984 | Bott | |
| 4,800,470 A | 1/1989 | Hartsaw | |
| 5,347,434 A | 9/1994 | Drake | |
| 5,422,794 A | 6/1995 | Drake | |
| 6,114,954 A * | 9/2000 | Palett | B60Q 1/2611 224/321 |
| 6,550,414 B1 | 4/2003 | Correll et al. | |
| 6,682,132 B1 * | 1/2004 | Hahn | B60J 7/00 296/210 |
| 6,702,370 B2 * | 3/2004 | Shugar et al. | 296/211 |
| 6,827,532 B1 | 12/2004 | Nix | |
| 7,081,810 B2 * | 7/2006 | Henderson | H01Q 1/3275 340/435 |
| 7,377,674 B2 | 5/2008 | Klinkman et al. | |

(Continued)

*Primary Examiner* — Anne Hines
*Assistant Examiner* — Jose M Diaz
(74) *Attorney, Agent, or Firm* — Harness, Dickey & Pierce, P.L.C.

(57) ABSTRACT

A vehicle article carrier system is disclosed for carrying articles above an outer body surface of a vehicle. At least one support rail is secured to the outer body surface. The support rail uses a support foot at each of its opposite ends, with each support foot being adapted to be secured to the outer body surface of the vehicle. A solar panel is used for collecting solar energy. A battery is used for storing electrical energy created using the collected solar energy. A light is powered by the battery, with the light forming an integral portion of the support rail.

16 Claims, 20 Drawing Sheets

(56) References Cited

U.S. PATENT DOCUMENTS

| | | | |
|---|---|---|---|
| 8,414,168 B2* | 4/2013 | Jutila | B60Q 1/24 362/487 |
| 2005/0212249 A1 | 9/2005 | Lopez | |
| 2007/0205240 A1* | 9/2007 | Castro | B60R 9/055 224/328 |
| 2007/0217212 A1* | 9/2007 | Klinkman | B60Q 1/24 362/493 |
| 2008/0128187 A1* | 6/2008 | Hu | B60L 8/00 136/244 |
| 2011/0084102 A1* | 4/2011 | Sautter | B60R 9/055 224/316 |
| 2011/0174855 A1* | 7/2011 | Carothers | B60R 9/055 224/328 |
| 2011/0240695 A1* | 10/2011 | Aftanas | 224/311 |
| 2012/0031939 A1 | 2/2012 | Jutila et al. | |
| 2013/0106135 A1* | 5/2013 | Praskovsky | B62D 35/001 296/180.1 |
| 2014/0313343 A1* | 10/2014 | Frank | H04N 5/33 348/164 |
| 2015/0180178 A1* | 6/2015 | Ranka | B60R 9/058 403/299 |

\* cited by examiner

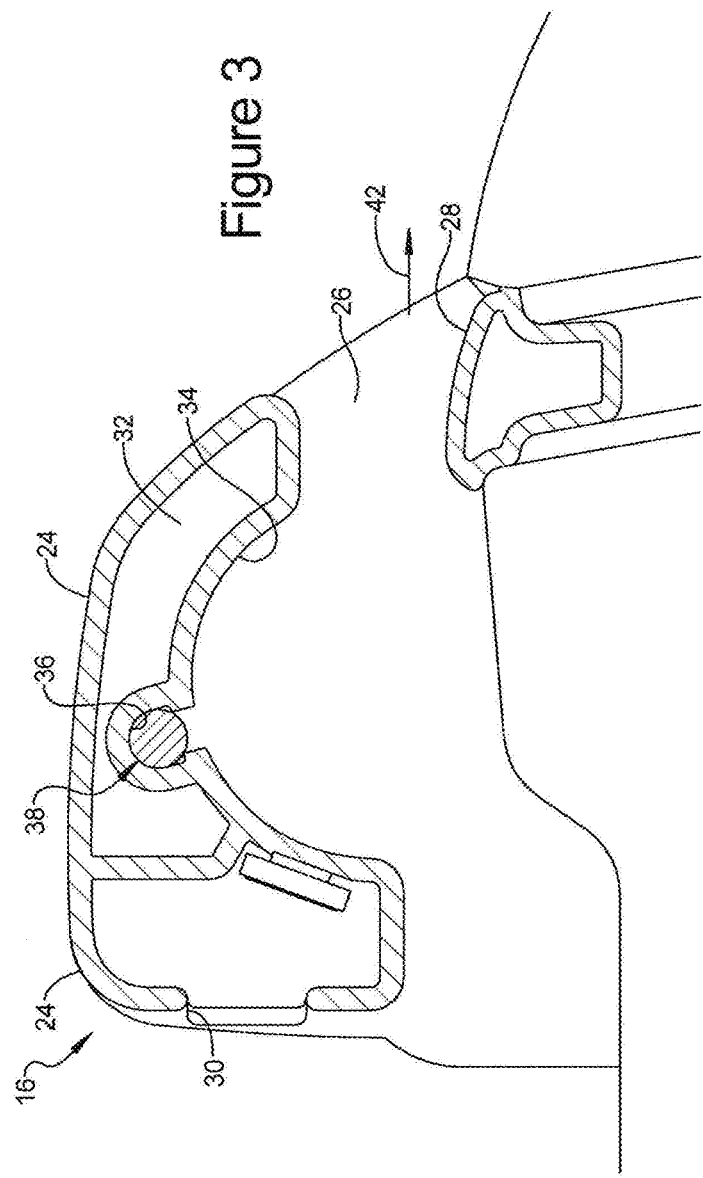
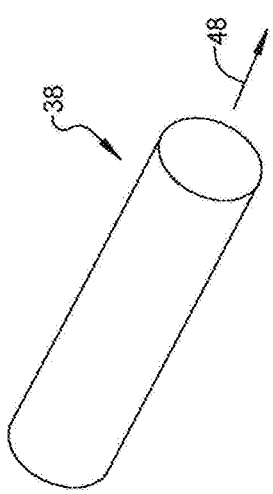

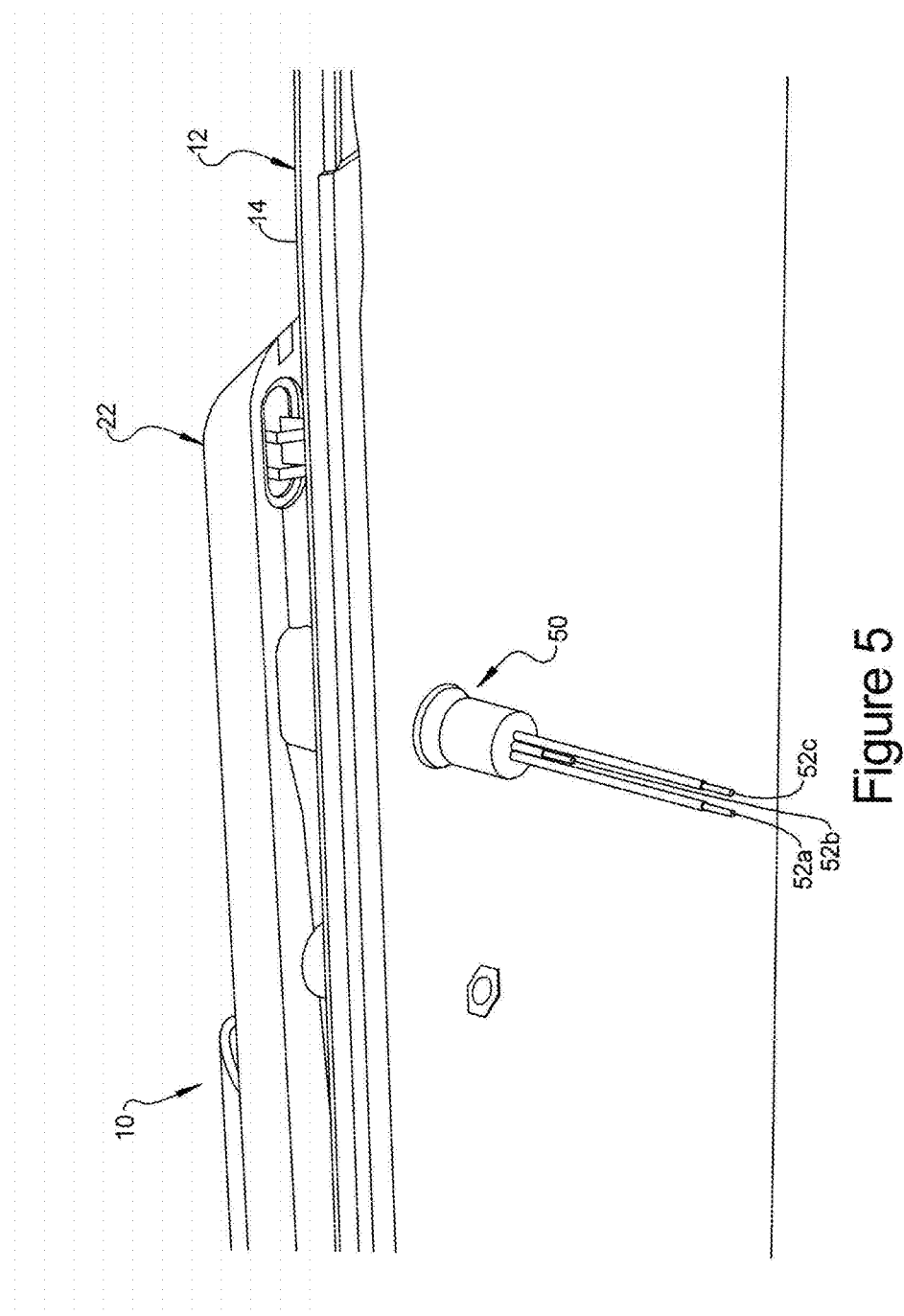

VEHICLE ARTICLE CARRIER WITH INTEGRATED CAMERA AND SOLAR POWERED LIGHTING

CROSS-REFERENCE TO RELATED APPLICATIONS

This application claims the benefit of U.S. Provisional Application No. 61/561,325, filed on Nov. 18, 2011. The entire disclosure of the above application is incorporated herein by reference.

FIELD

The present disclosure relates to vehicle article carrier systems, and more particularly to a vehicle article carrier system which in one embodiment integrates a solar panel cell and a rechargeable battery for powering a fiber optic light pipe carried on one or more components of the vehicle article carrier. In another embodiment an electronic assembly with an integrated antenna is housed within a component of the vehicle article carrier. In still another embodiment one or more cameras are integrally carried on one or more components of the vehicle article carrier and able to provide images of areas adjacent to the vehicle to a vehicle owner's cell phone or to an in-dash display of the vehicle.

BACKGROUND

This section provides background information related to the present disclosure which is not necessarily prior art.

Vehicle article carriers are used in a wide variety of applications to transport variously articles above an outer body surface of a vehicle. Typical vehicles, without limitation, are cars, trucks, SUVs, station wagons, minivans, full size vans and pickup trucks. The assignee of the present application, JAC Products, Inc. has been a leader in the design, development and production of a wide variety of vehicle article carriers for use on motor vehicles.

While previously developed vehicle article carriers developed by the assignee have proven to be successful and highly useful in transporting articles, it would still be useful if the vehicle article carrier incorporated some means of illumination by which the visibility of the vehicle to the operators of other vehicles is significantly improved. Moreover, it would be highly useful if the means for illuminating was self-powered such that there is no need for the vehicle's battery to be used to provide the necessary electrical power to the illumination means.

Still further, it would be highly desirable if a security feature could be integrated into a vehicle article carrier to provide a degree of added security to a user of the vehicle. By "security" feature it is meant some means or mechanism by which one or more images of areas around the vehicle could be generated and somehow provided to a user, such as remotely to the user's cell phone, so that the user could view the areas adjacent the vehicle as the user approaches the vehicle. This would be extremely desirable when the vehicle is parked in parking structures and other somewhat-secluded areas, where an individual would be able to hide in an area adjacent the vehicle without the vehicle owner being able to see the individual as the owner approached the vehicle to enter it. Such a feature would provide a high degree of additional security to the vehicle owner and potentially alert the vehicle owner to situations that present a danger to the vehicle owner.

SUMMARY

In one aspect the present disclosure relates to a vehicle article carrier system for carrying articles above an outer body surface of a vehicle. The system may comprise at least one support rail secured to the outer body surface. The support rail may include a support foot at each of its opposite ends, with each support foot being adapted to be secured to the outer body surface of the vehicle. A solar panel may be included for collecting solar energy. A battery may be included for storing electrical energy created using the collected solar energy. A light may be included and configured to be powered by the battery, with the light forming an integral portion of the support rail.

In another aspect the present disclosure relates to a vehicle article carrier system for carrying articles above an outer body surface of a vehicle. The system may include at least one support rail secured to the outer body surface. The support rail may include a longitudinal portion having a support foot at each of its opposite ends. Each support foot may be adapted to be secured to the outer body surface of the vehicle. A DC power source may be integrated into the support rail. A camera may be integrated into the support rail and powered by the DC power source.

In still another aspect the present disclosure relates to a vehicle article carrier system for carrying articles above an outer body surface of a vehicle. The system may comprise at least one support rail secured to the outer body surface. The support rail may include a support foot at each of its opposite ends. Each support foot may be adapted to be secured to the outer body surface of the vehicle. A solar panel cell may be included for collecting solar energy. A battery may be included for storing electrical energy created using the collected solar energy. A light may be included which is configured to be powered by the battery, with the light forming an integral portion of the support rail. A camera may be included which is integrated into one of the support rails and configured to be powered by the battery. The camera may be used for obtaining images looking in a first direction from the vehicle and wirelessly providing the images to a display system inside the vehicle.

DRAWINGS

The drawings described herein are for illustration purposes only and are not intended to limit the scope of the present disclosure in any way.

FIG. 3 is a cross sectional end view of the support rail of FIG. 2 taken along section line 3-3 in FIG. 2, illustrating a light transmitting element that is contained within a channel of the support rail, where the light transmitting element generates a quantity of light to assist in lighting the sides of the vehicle;

FIG. 4 is a perspective view of a portion of the light transmitting element;

FIG. 5 is a perspective view of a portion of the support rail of FIG. 2 taken from underneath the outer body surface of the vehicle, and showing the LED housing and its associated conductors secured within a hole in the outer body vehicle surface;

FIG. 14A is a perspective view of a cover that may be used to form a hermetically sealed enclosure for the circuit board of FIG. 14.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
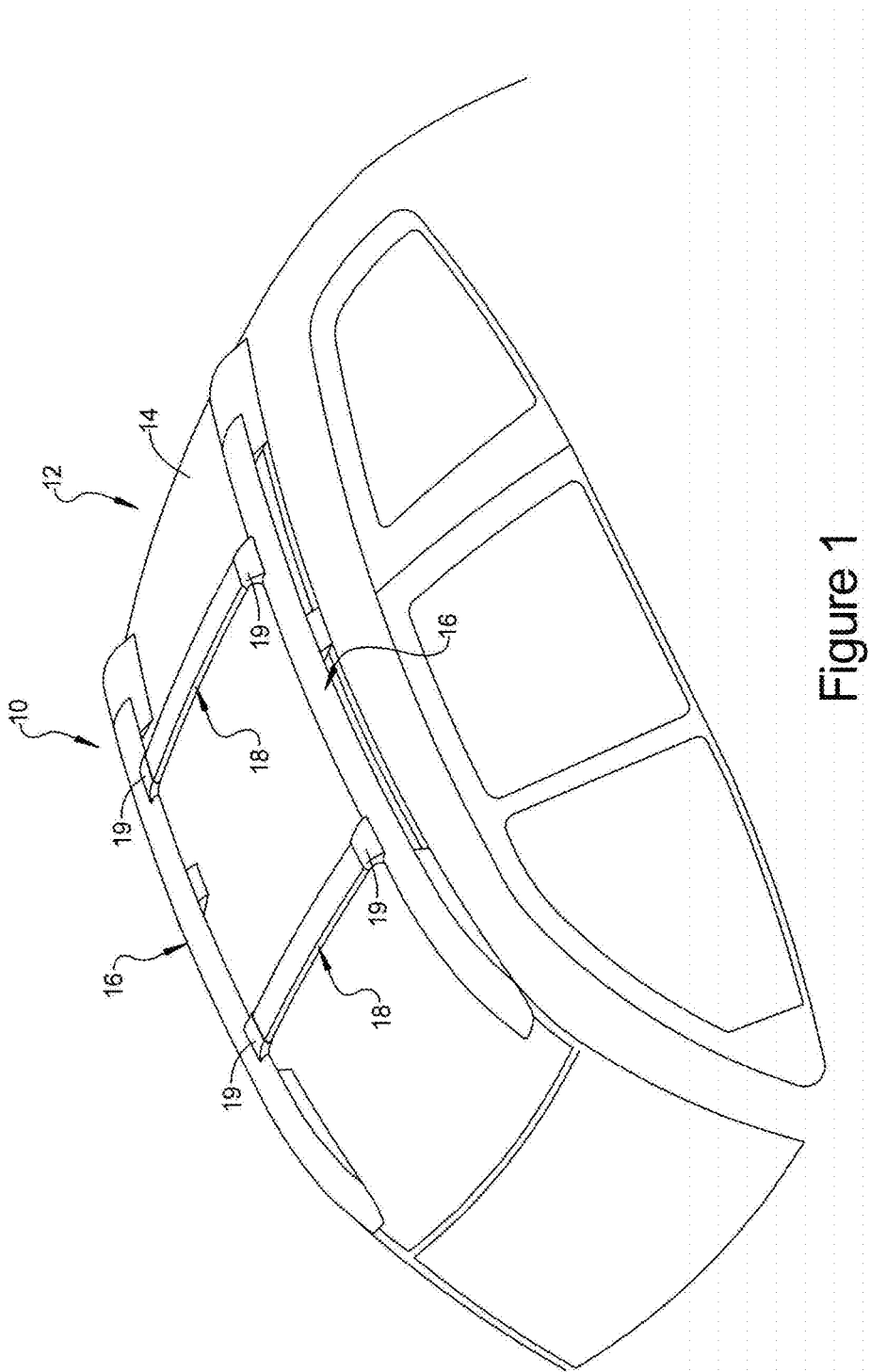
FIG. 1 shows a perspective view of one embodiment of a vehicle article carrier system in accordance with the present disclosure, with the system being secured to an outer body surface of a passenger motor vehicle.

Referring to FIG. 1 a motor vehicle 12 is shown in which one embodiment of a vehicle article carrier system 10 in accordance with the present disclosure is secured to the motor vehicle 12. The vehicle article carrier system 10 is secured to an outer body surface 14 of the motor vehicle 12 and includes a pair of support rail assemblies 16 secured parallel to one another to extend along a major longitudinal axis of the motor vehicle 12. A pair of cross bars 18 is supported by the support rail assemblies 16 such that the cross bars 18 extend perpendicularly across between the support rail assemblies 16. Each of the cross bars 18 may incorporate an end support 19 at both ends thereof that may be secured to the support rail assemblies 16. While two cross bars 18 are shown, it will be appreciated that a greater or lesser number of cross bars may be employed. One or both of the cross bars 18 may be adjustably positionable on the support rail assemblies 16 to better configure them to support variously sized articles thereon above the outer body surface 14. The vehicle article carrier system 10 may be used on sedans, wagons, cross overs, sport utility vehicles, and possibly even over the bed of a pickup truck with possibly only minor modifications. Accordingly, the vehicle article carrier system 10 is not limited to use with only one specific type of vehicle.

Figure 2:
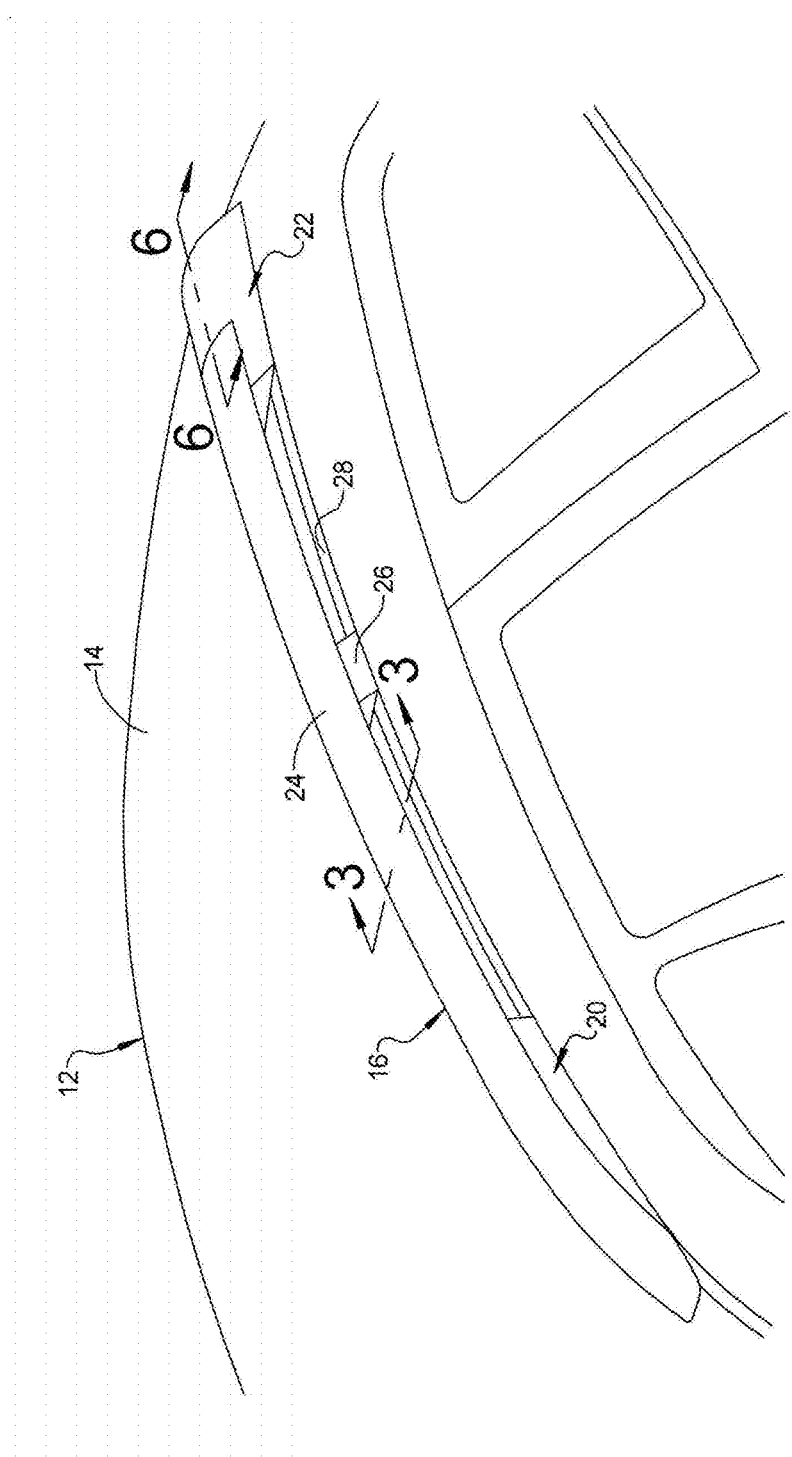
FIG. 2 is an enlarged perspective view of just one support rail of the system of FIG. 1 secured to the outer body surface of the vehicle.

Referring to FIG. 2 an enlarged illustration of one of the support rail assemblies 16 is provided. In this example both of the support rail assemblies 16 are of identical construction, so the following description of the construction of one of the support rail assemblies 16 shown in FIG. 2 will apply equally to the construction of the other one of the support rail assemblies 16. The support rail assembly 16 includes a front support foot 20, a rear support foot 22 and a support rail 24 that extends between the front support foot 20 and the rear support foot 22. An optional center support foot 26 is provided in this implementation. A decorative molding 28 is shown positioned in the ditch channel of the outer body surface 14.

Referring to FIG. 3, the cross-sectional construction of the support rail 24 is shown. The support rail 24 has a longitudinally extending, sideways opening channel 30 that extends along the support rail 24. The end supports 19 at one end of each of the cross bars 18 may be secured to the channel 30 via any suitable clamping-like structure. Suitable end supports and cross bars are disclosed in U.S. Pat. Nos. 7,198,184 and 6,779,696, as well as U.S. Patent Publication 2007/0151188 owned by JAC Products, Inc., and the disclosure of each of these documents is hereby incorporated by reference into the present disclosure.

The support rail 24 may also include a hollow section 32 and a lower surface that forms a semi-circular shaped undersurface portion 34. A channel 36 may be formed to extend longitudinally along at least a major portion of a length of the support rail 24 in which a light transmitting element 38 is disposed. The light transmitting element 38 may thus extend parallel to a longitudinal axis of the support rail 24 and along a major portion of the longitudinal length of the support rail 24. The light transmitting element 38 may be formed by virtually any type of fiber optic type cable or light transmitting component. Preferably the light transmitting element 38 is at least somewhat flexible. One component that is especially well suited for use as the light transmitting element 38 is a commercially available LED light strip. The LED (Light Emitting Diode) light strip is highly energy efficient and can be driven by a low DC voltage. If a conventional fiber optic cable is used, then a light source will be required to feed an optical signal in to one end or the other of the fiber optic cable. In one embodiment the light transmitting element 38 may simply be inserted into the channel 36 during assembly of support rail 24. Alternatively, suitable fastening clips, adhesives or any other suitable structure could be used to help hold the light transmitting element 38 within the channel 36, if needed. The light transmitting element 38 operates to radiate light along its length, with a substantial portion of the light being directed toward the outer body surface 14 of the vehicle 12. The semi-circular shaped undersurface portion 34 and the decorative molding strip 28 may also help to reflect light towards the side of the vehicle 12 in the direction of arrow 42. The percentage of light reflected may be dependent in part on the color of the semi-circular undersurface portion 34, the precise shape of the semi-circular undersurface portion 34, the color of the outer body surface 14, and the color of the decorative molding 28. Optionally, a reflective surface coating may be applied to the semi-circular undersurface portion 34 and/or its shape tailored to reflect the radiated light most efficiently in a desired direction.

A representative portion of the light transmitting element 38 is shown in FIG. 4. The light transmitting element 38 preferably has dimensions selected in accordance with the inner dimensions of the channel 36 so that it may be slid into the channel, yet still provide at least a small degree of frictional fit within the channel 36. As such, the cross sectional shape of the light transmitting element 38 will be selected at least in part based on the cross sectional shape of the walls that form the channel 36, and such that a significant portion of the light transmitting element 38 will be able to radiate optical energy out from the channel 36. In this regard it will be appreciated that the channel 36 may take a variety of cross sectional shapes, and it will be appreciated that the channel 36 as shown in FIG. 3 is but one suitable cross-sectional shape that may be used.

Referring to FIG. 5, the rear support foot 22 of the support rail 16 is shown positioned over an LED housing 50 which houses an LED (not visible in FIG. 5) therein. A plurality of electrical conductors 52a, 52b and 52c extend from the LED housing 50 that may be connected to suitable conductors of a wiring harness of the vehicle 12. The conductors 52a, 52b and 52c may be used to allow control over the operation of the LED in accordance with use of a key FOB of the vehicle, a turn signal of the vehicle, or possibly even the headlights or daytime running lights of the vehicle, or possibly when the vehicle's lights are placed in the emergency flashing condition. Thus, the LED can be controlled to turn on for a controlled time when an operator presses an "UNLOCK" button on the vehicle's key FOB. Alternatively, the LED can be turned on by a suitable electrical signal when the vehicle headlights are turned on, when a brake pedal of the vehicle 12 is depressed, or whenever the daytime running lights of the vehicle are turned on, presuming that the vehicle incorporates daytime running lights. It will be appreciated that the ON/OFF operation of the LED could be controlled in virtually any fashion assuming suitable electrical power and control signals are applied thereto.

Figure 6:
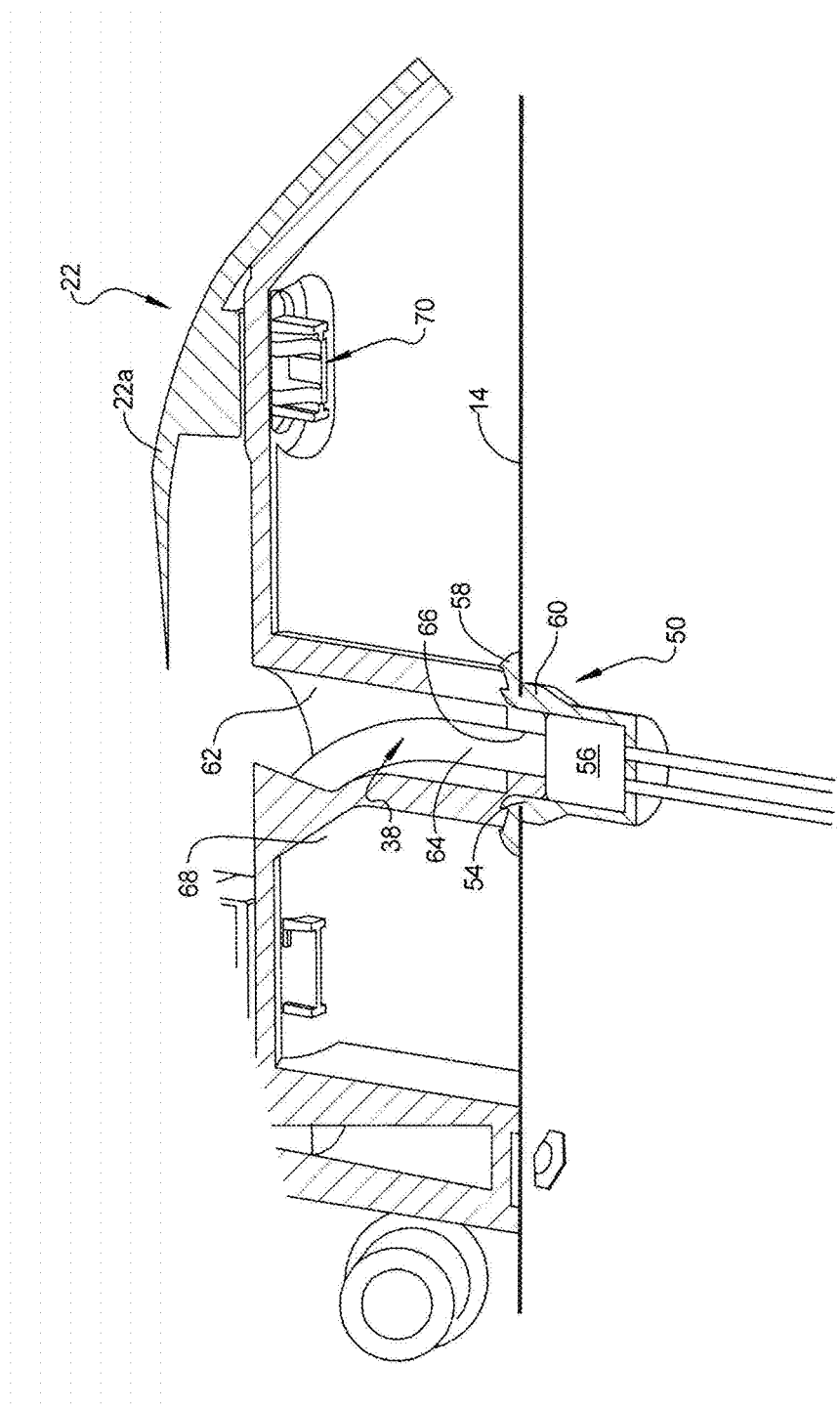
FIG. 6 is a cross sectional view of a portion of one rear support foot taken in accordance with section line 6-6 in FIG. 2 illustrating the abutting coupling of an input end of the light transmitting element with the LED housing, and further illustrating how the LED housing is retained within the hole in the outer body surface of the vehicle.
Figure 7:
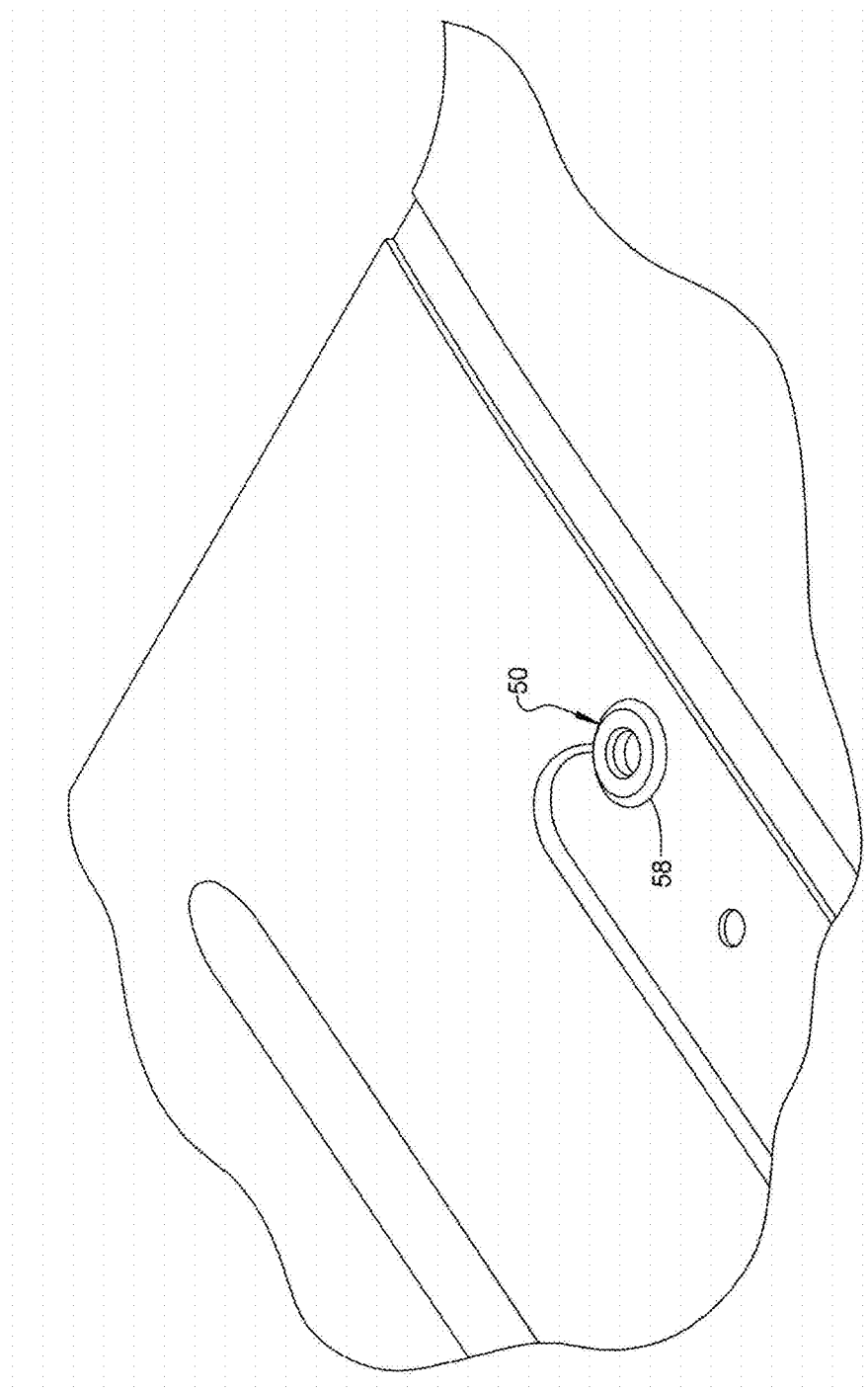
FIG. 7 is a perspective view looking down onto the outer body surface of the vehicle without the support rail of FIG. 2 attached, to illustrate the LED housing and the light that is projected upwardly through the hole in the outer body surface.

With reference to FIG. 6, the LED housing 50 can be seen in greater detail installed within an opening 54 in the outer body surface 14 of the vehicle 12. The LED housing 50 houses at least one LED 56 therein and may be formed from a relatively stiff rubber or a combination of plastic or metal, with a rubber coating there over. The LED housing 50 may preferably incorporate a flange 58 and a lip 60 that form a narrow circumferential channel therebetween. The LED housing 50 may have a diameter that is selected to be just slightly smaller than the diameter of the opening 54, and may be inserted through the opening 54 from an exterior side of the outer body surface 14. When inserted into the opening 54 in this manner the lip 60 is compressed as it passes through the opening 54, and the LED housing 50 then engages the opening so that the LED housing 50 is captured in the channel between the flange 58 and the lip 60. The LED housing 50 is shown in FIG. 7 without the support rail 16 positioned on the outer body surface 14. It will be appreciated that while a single LED 56 is illustrated in FIG. 6 within the LED housing 50, that two or more LEDs could be housed therein depending on the size of the housing and the size of the opening 54. Alternatively the LED housing 50 may form an enclosure for housing a circuit board with one or more LEDs, where the housing is secured by any suitable means over the opening 54. Thus it will be appreciated that the LED housing 50 may take a wide variety of shapes and sizes as needed to meet the needs of a specific application.

Figure 8:
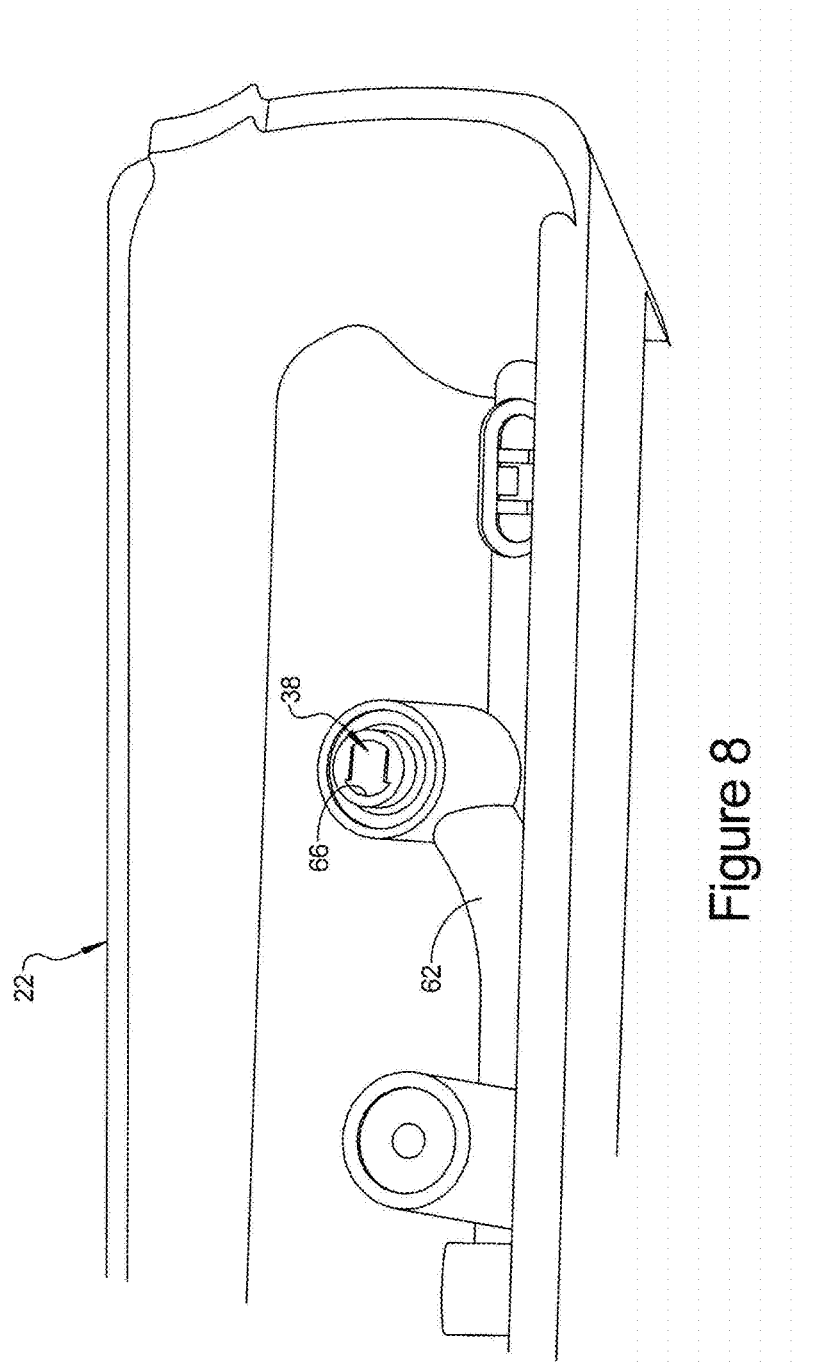
FIG. 8 is a perspective view of the undersurface of a portion of the rear support foot portion of the support rail of FIG. 2 illustrating how the input end of the light transmitting element is supported in a boss portion within the rear support foot portion.
Figure 9:
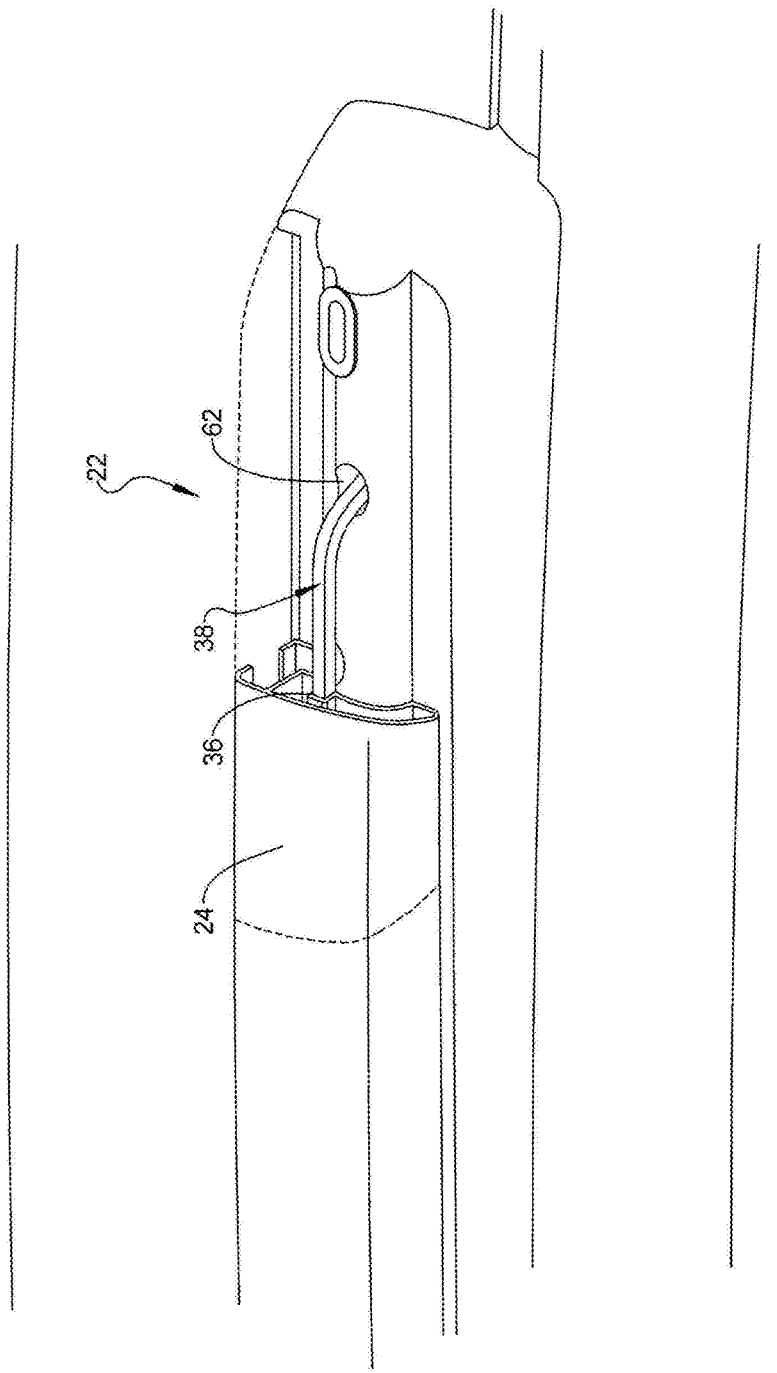
FIG. 9 is a partial cross sectional view of the rear support foot used to support the support rail of FIG. 2, and how the light transmitting element passes through an opening in surface portion into the boss portion.

With further reference to FIG. 6, the rear support foot 22 may include an integrally formed, curving channel 62 that holds an input end 64 of the light transmitting element 38 and helps to form a 90 degree bend in the light transmitting element 38 as it extends through the channel 62. In this embodiment it will be appreciated that the light transmitting element 38 is a passive component, for example an optical fiber, that requires an optical input signal be input to one end of the light transmitting element 38, and thus that at least one end of the element 38 be placed in close proximity with a light source. In this example the input end 64 may extend through an opening 66 into abutting contact with the LED 56 or close to abutting contact. It is not critical that the input end 64 of the light transmitting element 38 actually contact the LED 56 or be perfectly concentrically aligned with the LED 56. It is sufficient for the LED 56 to transmit substantially all of its optical energy into the light transmitting element 38 if the input end 64 is merely closely adjacent to the LED 56. It is acceptable if the input end 64 is positioned at least within a few millimeters of contacting the LED 56, and substantially concentrically aligned with the LED 56. The channel 62 preferably includes a curving portion 68 that provides a gradual bend to the light transmitting element 38 to prevent kinking it. FIG. 8 illustrates a face of the input end 64 of the light transmitting element 38 as it appears before the rear support foot 22 is secured to the outer body surface 14. FIG. 9 illustrates the rear support foot 22 and the support rail 24 with a portion of the light transmitting element 38 exposed.

It is a significant benefit of the above-described design and construction of the support rail 16 that no electrical or mechanical connectors are required to interface the input end 64 of the light transmitting element 38 to the LED 56, when the light transmitting element is a passive component like a fiber optic cable. Simply positioning the face of the input end 64 of the light transmitting element 38 against, or closely adjacent to, the LED 56 is sufficient to couple the light from the LED 56 into the light transmitting element 38. This arrangement significantly simplifies the construction of the support rail 16, expedites its attachment to the outer body surface 14 and helps to reduce the overall cost of the system 10. Moreover, since no electrical connector is required, there is no possibility that moisture or corrosion of the contacts of the electrical connector may affect the coupling of the optical signal from the LED 56 into the light transmitting element 38.

The support rail 16 may be assembled by positioning (e.g., press fitting) the light transmitting element 38 within the channel 36 of the support rail 24, and such that a predetermined length of the input end 64 is projecting from an end of the support rail 24 that will pass through the rear support foot 22. The free end (i.e., the input end 64) of the light transmitting element 38 is then positioned in the channel 62 of the rear support foot 22 such that the input end extends into the opening 66 (FIG. 6). The rear support foot 22 and the front support foot 20 may then be secured to the outer body surface 14 of the vehicle 12, and the support rail 24 may then be secured to the support foot portions 22 and 24 by any suitable fasteners (not shown). In one embodiment a decorative cover, such as cover 22a in FIG. 6, may be secured to the rear support foot 22 to cover the channel 62 and the area where the light pipe 38 enters the channel 36 in the support rail 24. Fastening of the decorative cover 22a may be accomplished by the use of suitable cooperating flexible tab structures 70 on the decorative cover 22a and the rear support foot 22, or by any other suitable means of attachment.

It will be appreciated that while the support rail 16 has been described as incorporating a single length of the light transmitting element 38, that two or more separate lengths of the light transmitting element 38 may be incorporated. In such an implementation, a corresponding number of LEDs 56 may be incorporated to provide an independent optical signal to each section of the light transmitting element 38. In some applications this may provide more uniform intensity of illumination along the full length of the component being illuminated.

If the light transmitting element 38 is a DC powered light strip, then it will be appreciated that the LED housing 50 and the LED 56 will not be needed. Instead a suitable connection will need to be made to the light transmitting element to supply the needed DC power to it. The connection may be a physical plug-and-socket connection, or it may be an inductive coupling. If an inductive coupling is used, then magnets may also be used, one being at one end of the light transmitting element and the other being associated with the DC power source, such that when the two magnets are brought into close proximity to one another they will attract and physically engage one another. However, virtually any type of coupling could be used to facilitate the supply of DC power to the light transmitting element 38. As another example, the LED 56 within the housing 50 could be replaced with a simple plug or socket which is seated within the housing 50. The plug or socket may then mate with a corresponding component attached to the end of the light transmitting element 38.

Figure 10:
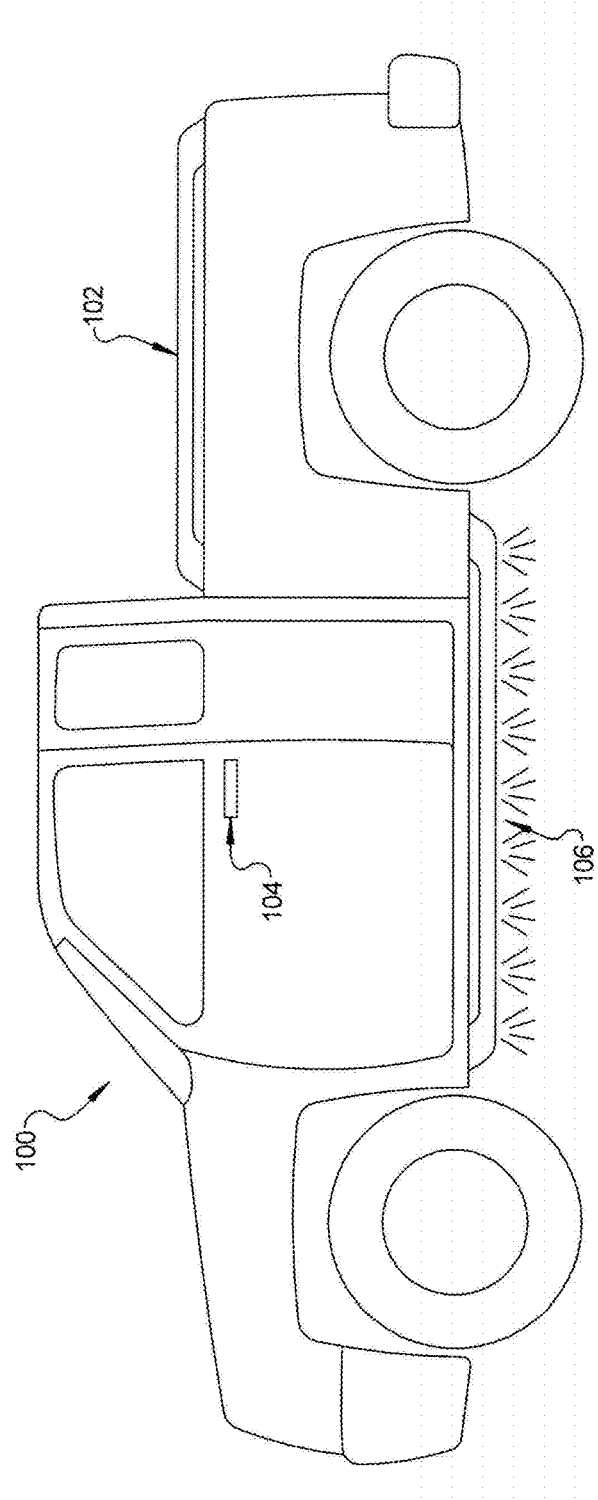
FIG. 10 is a side view of a pickup truck incorporating a grab rail, a door handle molding and a step bar that each incorporates the teachings of the present disclosure.

Referring briefly to FIG. 10, a pickup truck 100 is shown that incorporates the teachings of the vehicle article carrier system 10 in connection with a grab rail 102, a door handle molding 104 and a step bar 106. In this example each of the grab rail 102, door handle molding 104 and step bar 106 include one or more light transmitting components, such as light transmitting element 38, held within a channel such that light can be radiated outwardly from the channel to illuminate a limited area of the vehicle 100. It will also be appreciated that the light transmitting element 38 and the teachings related to the construction of the support rail 16 may also be applied to other vehicles such boats, personal watercraft, recreational vehicles, trailers, or any other form of vehicle where it is desired to light a limited portion of the vehicle.

Figure 11:
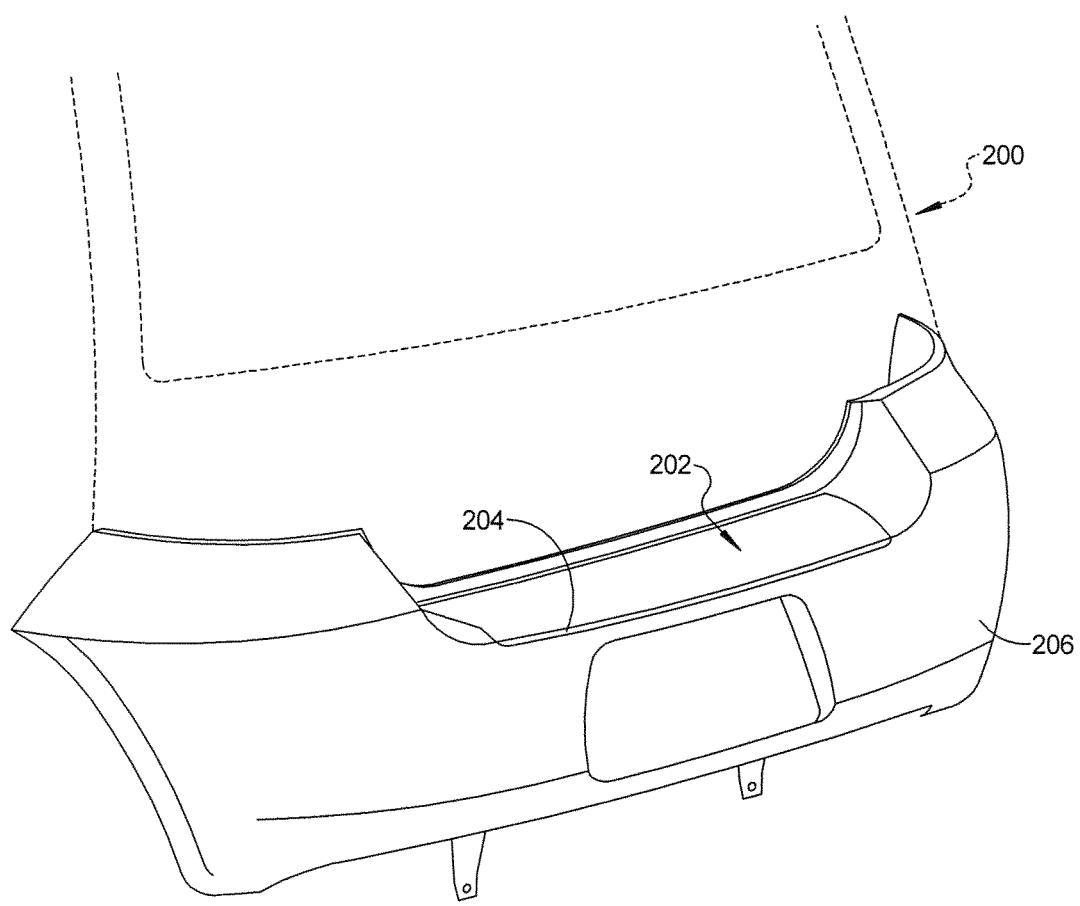
FIG. 11 is a perspective view of a rear bumper of a sport utility vehicle that incorporates a light transmitting element in the step bumper portion of the rear bumper, in accordance with the teachings of the present disclosure.

Referring to FIG. 11, a rear step bumper portion 202 of a bumper 206 of a sport utility vehicle 200 may incorporate a light transmitting element 204 therein. The light transmitting element 204 provides a small degree of light that assists in illuminating the rear step bumper portion 202. The light transmitting element 204 may be controlled by a key FOB associated with the vehicle 200 or in concert with the vehicle's headlights, brake lights, daytime running lights, emergency flashers, etc.

Figure 12:
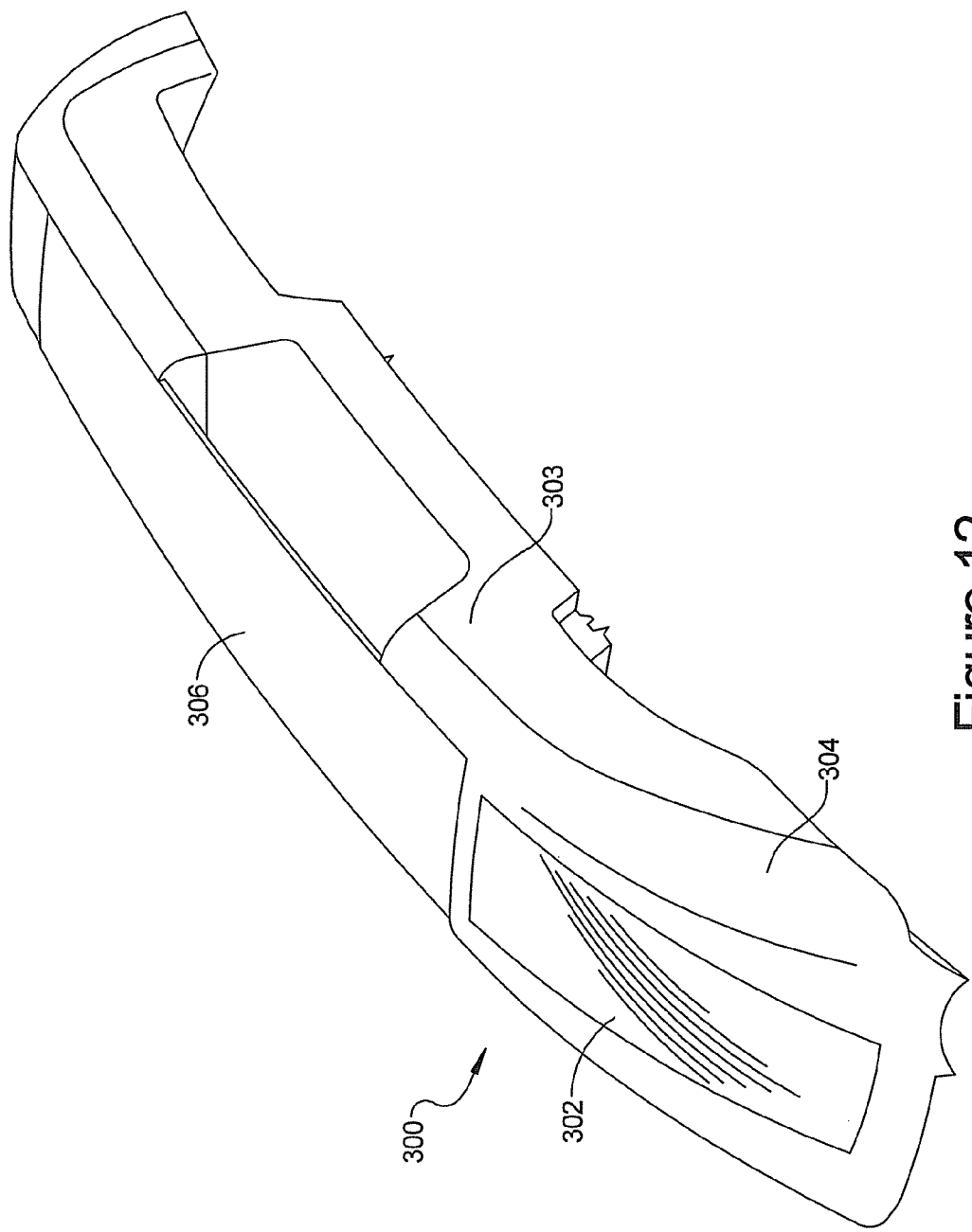
FIGS. 12 and 13 illustrate another embodiment of a support rail that includes an integrated solar panel cell, battery and wireless receiver.
Figure 13:
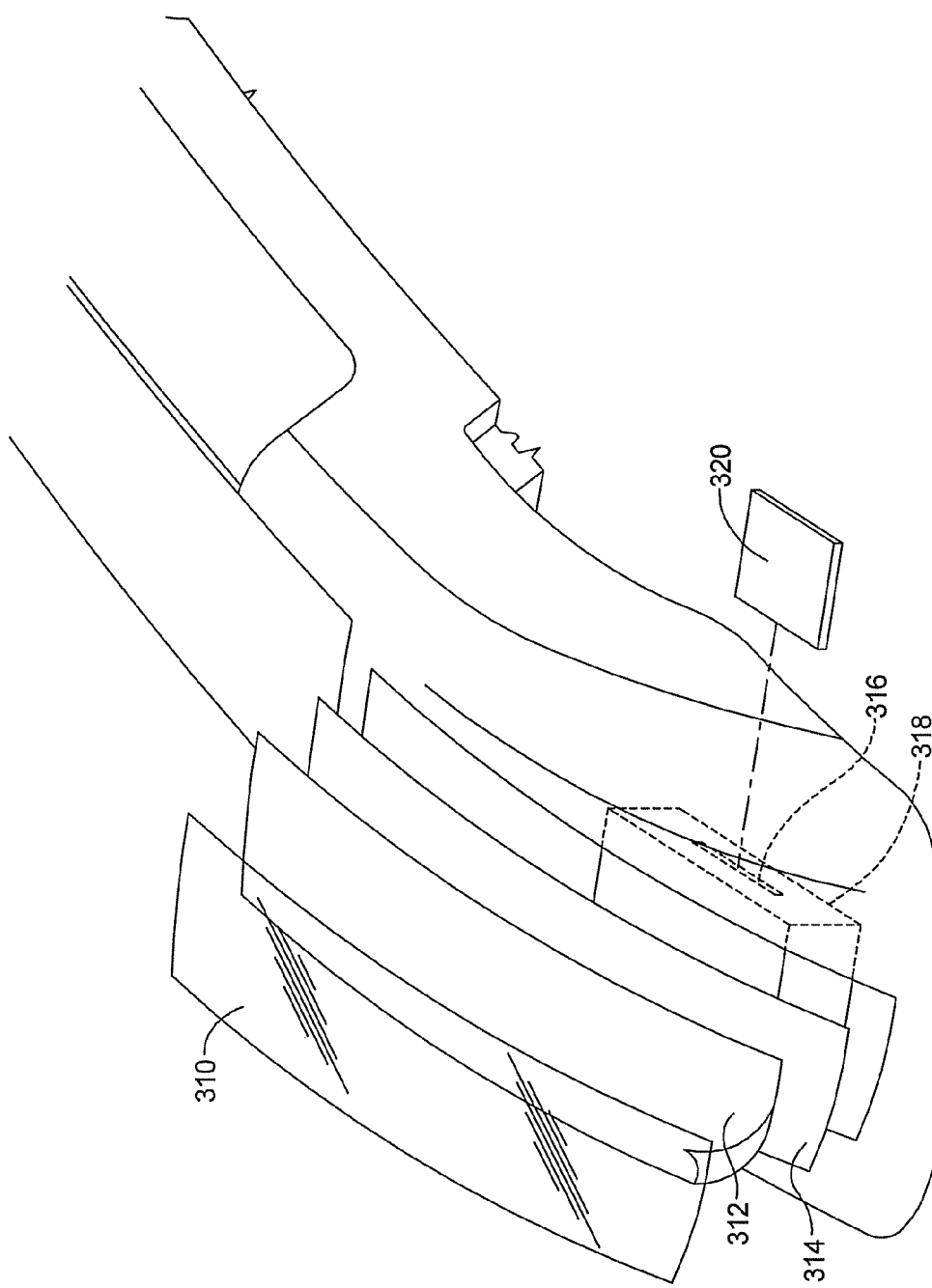

Referring to FIGS. 12 and 13, an embodiment of a support rail 300 is shown that may be used with the vehicle article carrier system 10 of FIG. 1. In this embodiment the support rail 300 includes a solar panel cell 302 that is integrated into at least one of a pair of support feet 304 of the support rail 300. Optionally, a pair of the solar panel cells 302 may be integrated into both of the support feet 304 at the opposing ends of the support rail 300. The support rail 300 may also include a longitudinal portion that spans between the two support feet, and the support feet are adapted to be secured to the outer body surface 14 of the vehicle 12. A cross bar assembly 306 may be supported along an intermediate portion of the support rail 300 in a stowed position so as to not interfere with or cover the solar panel cell 302.

In FIG. 13 the construction of the solar panel cell 302 can be seen in greater detail. It will be appreciated immediately that the solar panel cell 302 could potentially be integrated into other areas of the support rail 300 provided direct exposure to solar radiation still is provided. Moreover, additional solar panel cells 302 could potentially be integrated onto a portion of the cross bar assembly 306 at its outermost ends if needed. However, it is anticipated that providing the solar panel cells 302 at least at two of the support feet 304 will be a highly preferred configuration.

The solar panel cell 302 may include a protective glass cover portion 310, a solar film layer 312 and an aluminum panel 314 for supporting the solar film layer 312. A battery 316 may be placed in electrical communication with the solar film layer 312 via suitable electrical conductors or contacts that make an electrical connection between the solar film layer 312 and the terminals of the battery 316. The battery 316, as well as at least a portion of the solar panel cell 302, is preferably mounted in a recess or pocket 318 of the support foot 304. Preferably the recess or pocket 318 is of sufficient depth and shape such that the solar panel cell 302 is substantially flush with an outer surface of the support foot 304, and appears as an integral, built-in portion of the support foot 304, when the support rail 300 is fully assembled. The battery 316 is also coupled to a light (not shown), such as LED 56 shown in the FIG. 6, that generates optical energy that is focused into one end of a fiber optic light component (not shown), such as light transmitting element 38 in FIG. 6 (e.g., fiber optic cable), to thus provide DC power to power the LED. Optionally, the solar panel cell 302 can be used with the battery 316 to provide DC power to an active lighting component such as an LED light strip as described herein. The solar panel cell 302 is further secured in a manner such that water cannot enter the pocket 318. In one implementation the solar panel cell 302 may be a lightweight, printed CIGS (Copper, Indium, Gallium, and Selenium) solar film available from Nanosolar of San Jose, Calif. However, it will be appreciated that other constructions of solar cells could be used as well. The application of battery power to the light transmitting element 38 (or any other type of light carried on the support rail 300) can be further controlled such that power from the battery 316 is applied when a user presses a "LOCK" or "UNLOCK" button on his/her key FOB. In this embodiment the battery may be coupled to the light transmitting element 38 by some form of switch that is controlled by a signal from a conductor (or conductors) that communicates with the vehicle's electronics.

It will also be appreciated that a conventional photocell could also be implemented in the support rail 300 to further control the power applied to the battery 316 in connection with the sensing of the ambient light level. The photocell would detect when the ambient lighting drops below a predetermined level and automatically switch on battery power to the light transmitting element 38. This could be desirable as a security feature because the photocell would detect when dusk occurs, and would then apply power from the battery 316 to the light transmitting element 38. The light transmitting element 38 would thus be illuminating the vehicle during the night time hours, even when the occupant is not driving the vehicle or present near the vehicle with his/her key FOB. As such, the light pipe 38 would be kept illuminated such as when the vehicle is left unattended in a shopping mall parking lot after dark. This could potentially deter vehicle theft or tampering with the vehicle.

In another implementation the support rail 300 may include a wireless receiver 320 that is also powered by the battery 316 and located in the pocket 318. The wireless receiver 320 could be responsive to a key FOB associated with the vehicle so that the light transmitting element 38 turns on for a predetermined duration whenever the user presses the "LOCK" or "UNLOCK" button on the key FOB. The wireless receiver 320 could also potentially be responsive to a wireless signal from the vehicle's electronics whenever the vehicle's ignition is turned to the "ON" position so that the light transmitting element 38 is illuminated, and powered by the battery 316, whenever the vehicle is running. In this embodiment it will be appreciated that the support rail 300 with its light transmitting element 38, battery 316, solar panel cell 302 and the wireless receiver 320 forms a fully independent and self-contained assembly that does not require any hardwired electrical connections or power from the vehicle's electrical system.

Figure 14:
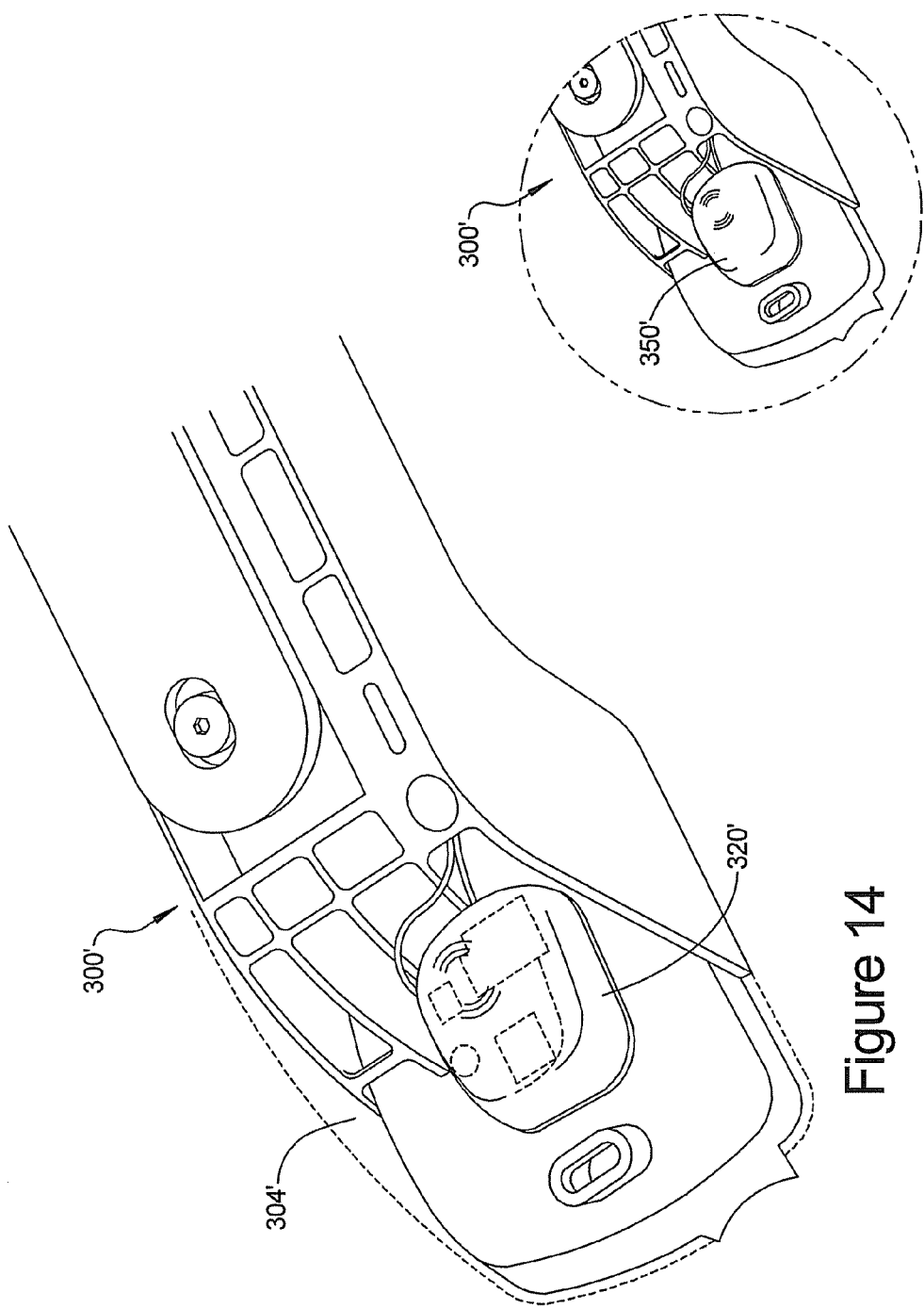
FIG. 14 shows an electronic assembly that may be mounted in one of the support feet to assist or enable functions relating to satellite radio, GPS or other wireless signal operations.

Referring briefly to FIG. 14, another embodiment of the support rail 300' is shown where an electronic assembly 320' having its own antenna is mounted in a support foot 304'. The electronic assembly 320' may be tailored to support satellite radio, GPS, auxiliary phone or radio operations. FIG. 14A illustrates a cover 350' that may be formed to cover the electronic assembly, and potentially form a hermetically sealed assembly.

Figure 15:
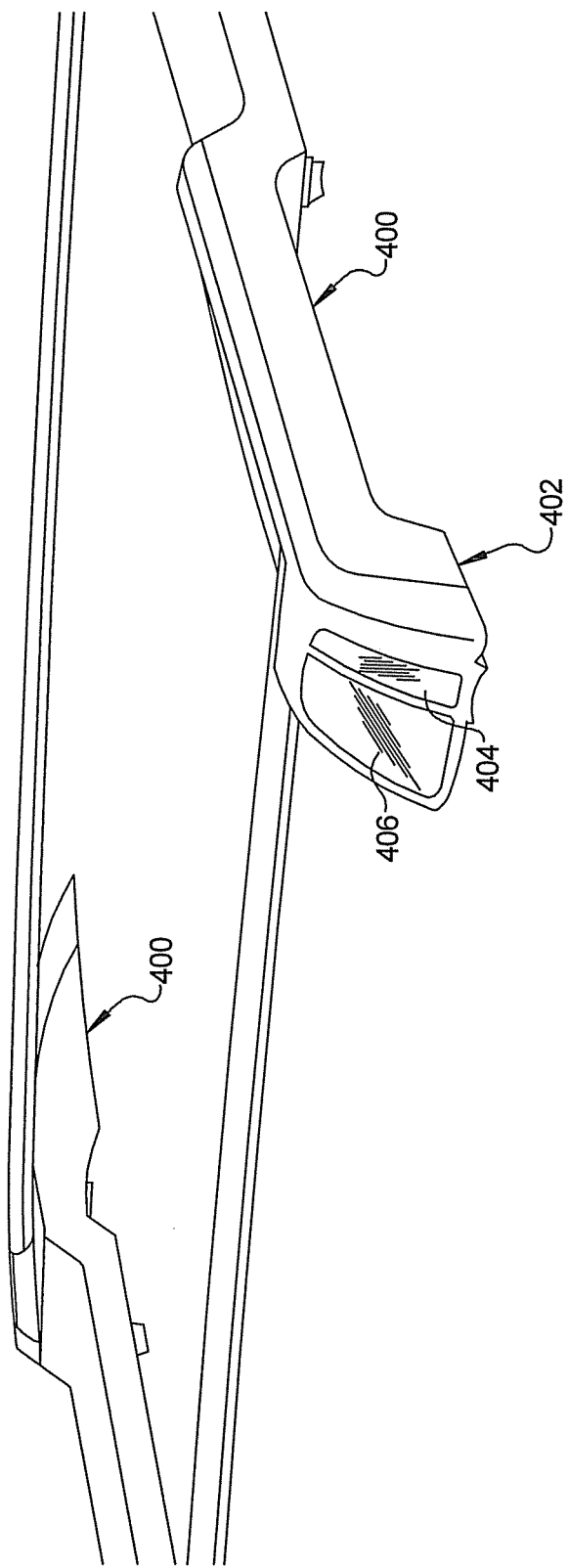
FIG. 15 illustrates another embodiment of a support rail that includes a pair of rear facing (relative to the vehicle) support feet that each include an integrated light and a reflector.

Referring now to FIG. 15, another embodiment of a support rail 400 is shown where the support rail includes a pair of rear facing (relative to the vehicle) support feet 402 that each includes an integrated light 404 and a reflector 406. While only one support foot 402 is shown, it will be appreciated that both rear facing support feet 402 may include the integrated light 404 and the reflector 406. Optionally, the reflector 406 could instead be a light that is responsive to the application of the brake pedal of the vehicle. Such would obviously require wired or wireless communication between the vehicle's brake system components (and/or possibly the vehicle's onboard computer) and the light.

Figure 16:
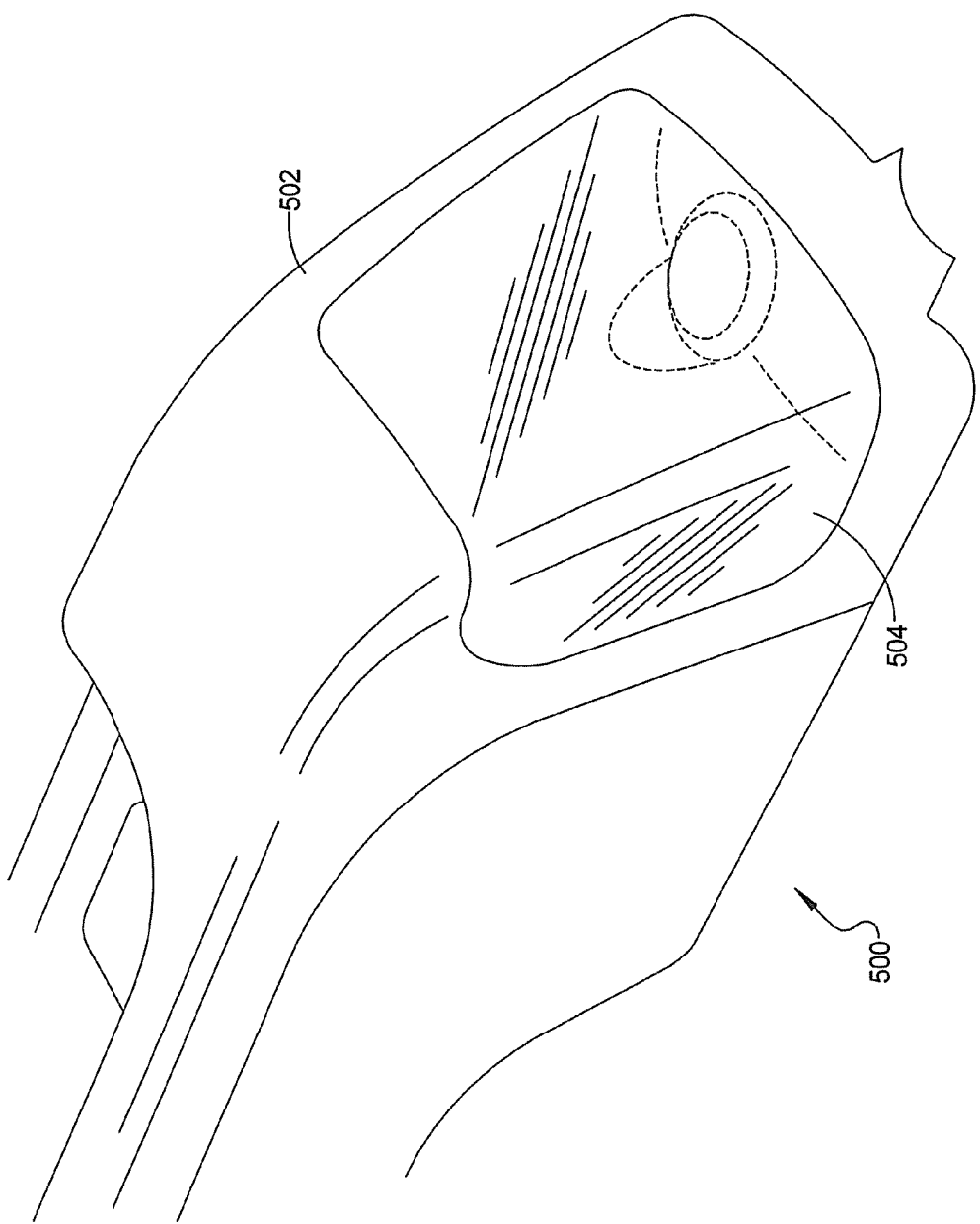
FIG. 16 illustrates another embodiment of a support rail in which the support rail includes an enlarged, integrated reflector built into its rear support foot.

Referring now to FIG. 16, an embodiment of a support rail 500 is shown that has an enlarged, integrated reflector 504 built into its rear support foot 502. The reflector 504 can be included at each one of the support feet 502 of both support rails 500 of a vehicle article carrier.

Figure 17:
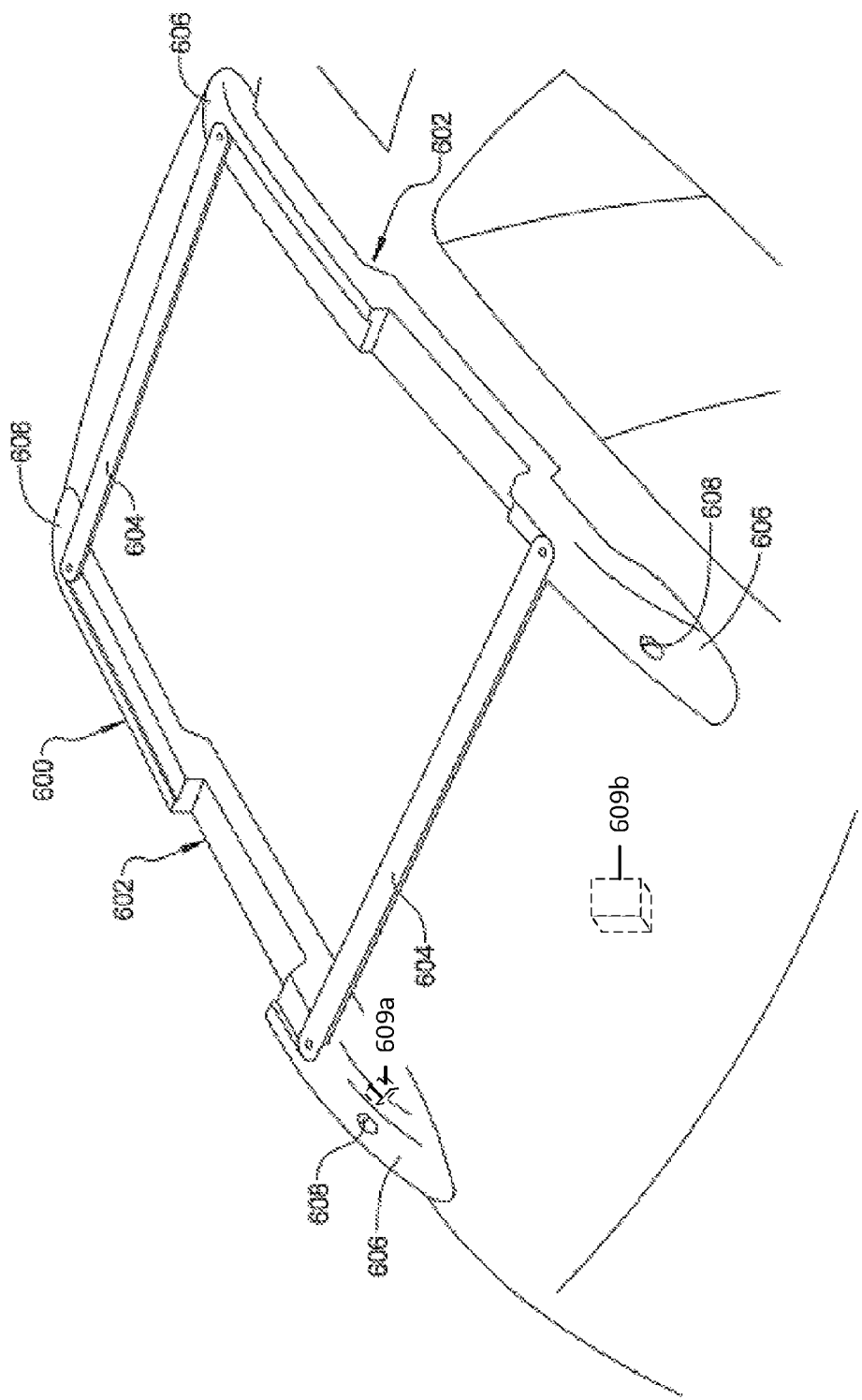
FIG. 17 illustrates another embodiment of a support rail in which a pair of support feet of the support rail each include a camera 608 that is able to image a predetermined range or swath of area adjacent to the vehicle.
Figure 18:
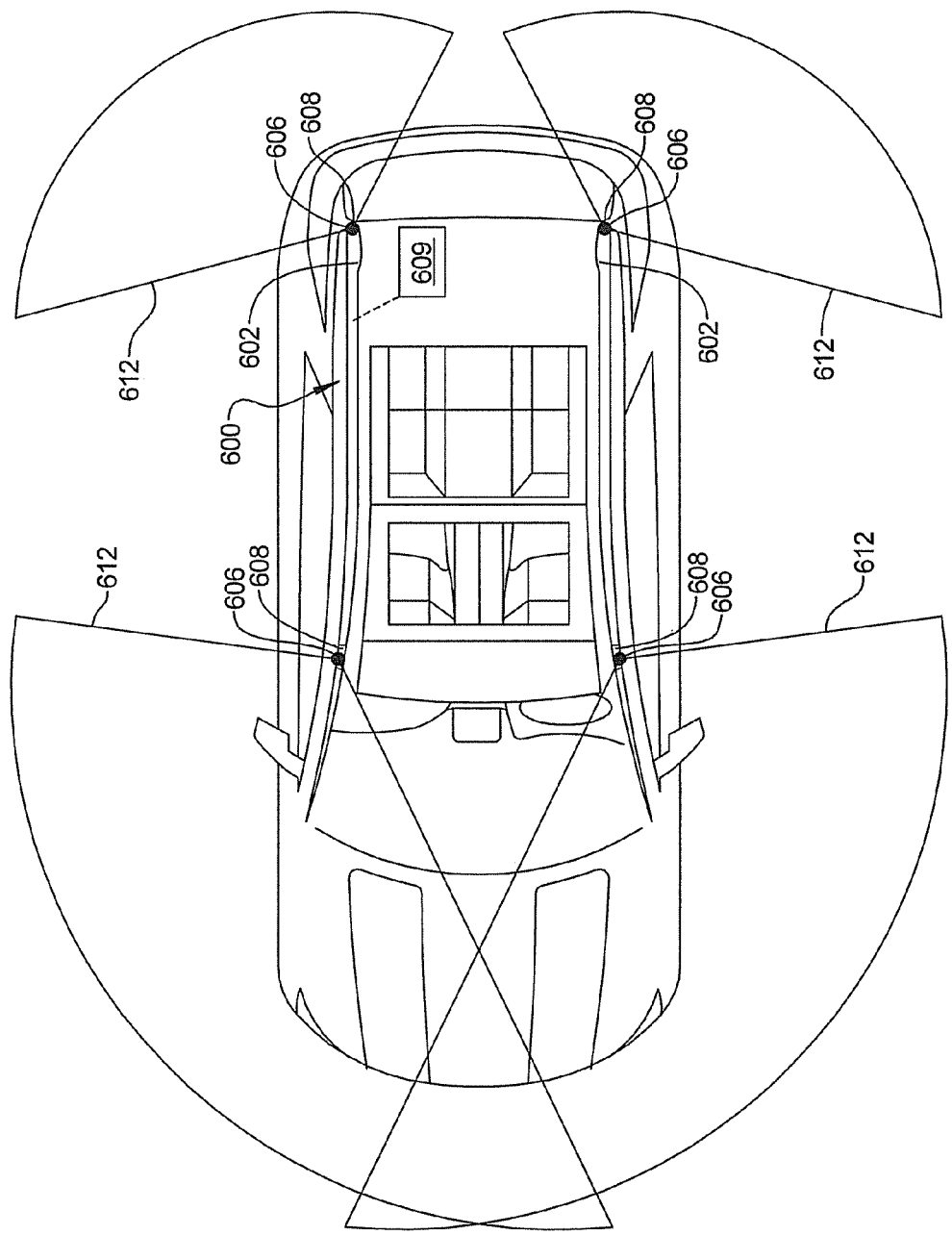
FIG. 18 is a planar view of a vehicle incorporating a pair of the support rails of FIG. 17, with each of the support rails including a camera at each of its support feet, and showing the coverage area provided by the four cameras.
Figure 19:
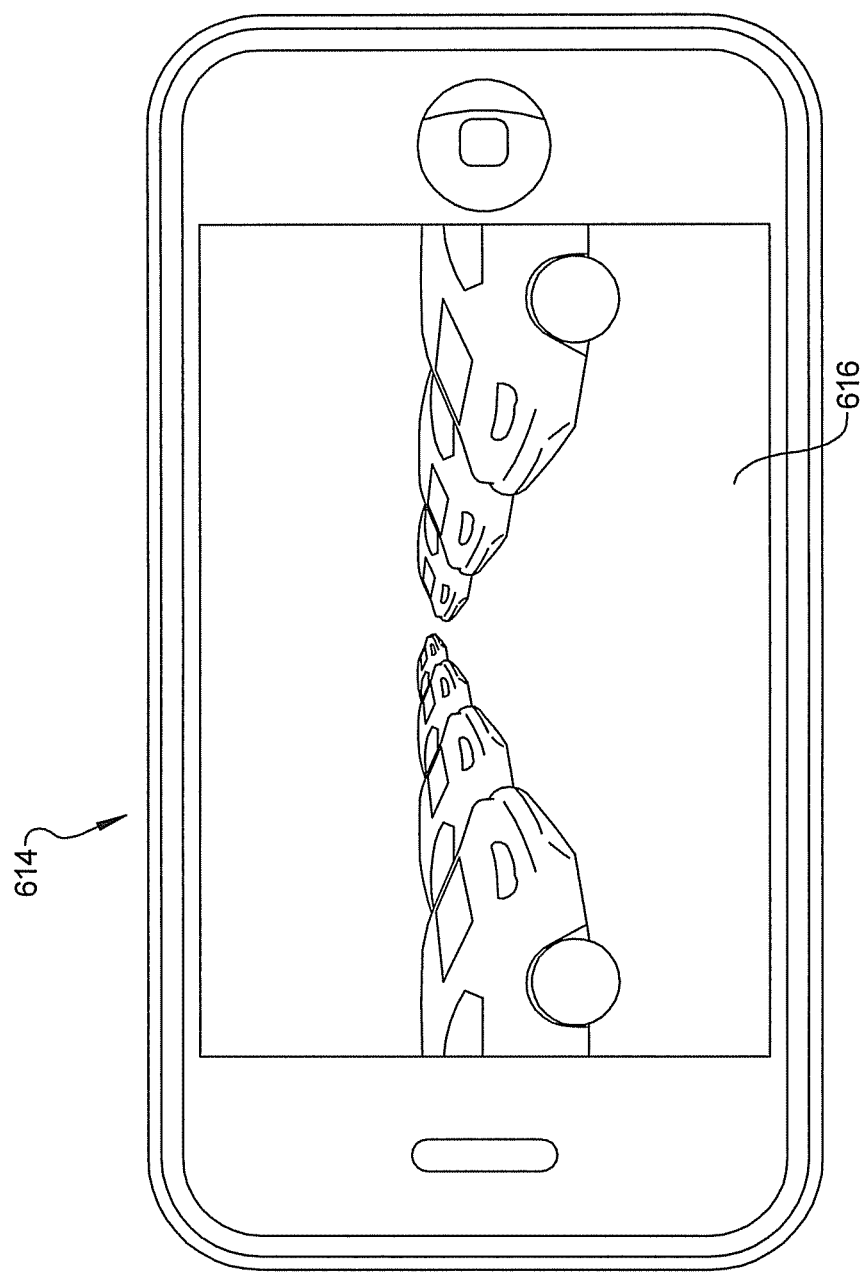
FIG. 19 shows an image that may be transmitted by one of the cameras of FIG. 18 to a user's cell phone for display.
Figure 20:
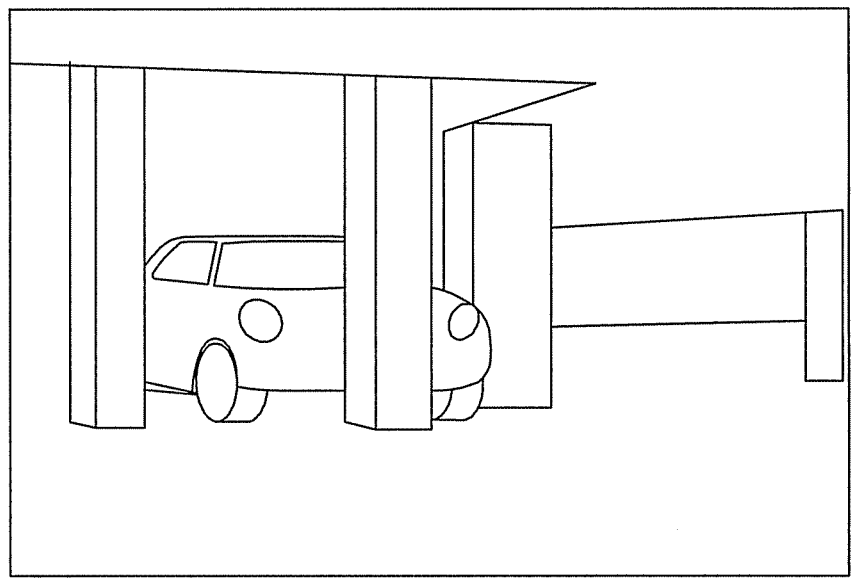
FIG. 20 shows a view from a different one of the cameras on the support rails of FIG. 18.
Figure 21:
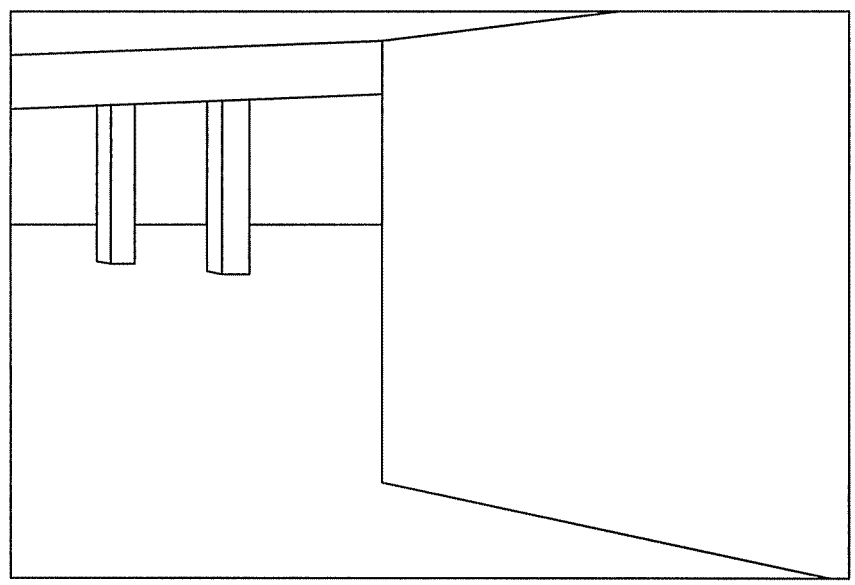
FIG. 21 shows yet another view from a different one of the cameras of the support rails of FIG. 18.
Figure 22:
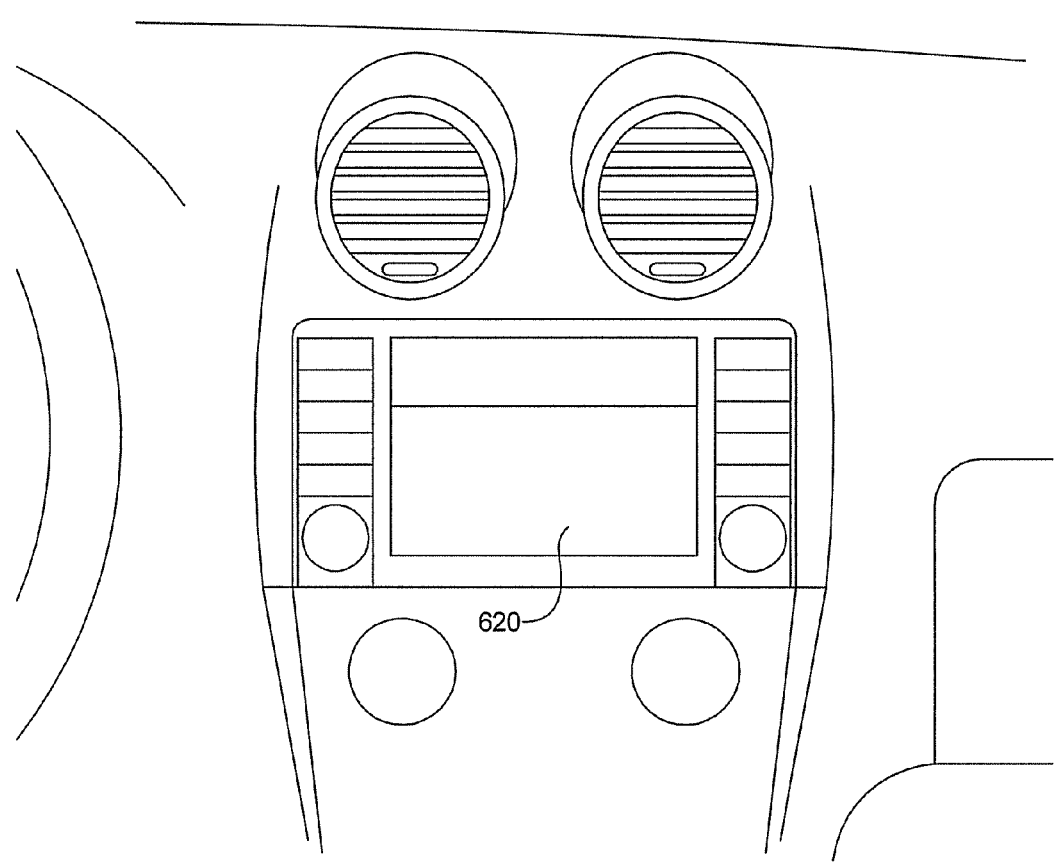
FIG. 22 is a view of an in-dash display system of the vehicle which is used for displaying images from one or more selected ones of the cameras.

Referring now to FIG. 17, an embodiment of a vehicle article carrier 600 is shown that includes a pair of support rails 602 and a pair of cross bars 604 that are stowable on the support rails 602 when the cross bars are not needed. Each support rail 602 includes a pair of support feet 606 at its opposite ends. Each support foot 606 includes a camera 608 that is able to image a predetermined range or swath of area adjacent to the vehicle. These ranges are indicated by reference numbers 612 in FIG. 18. From FIG. 18 it is apparent that the cameras 608 collectively provide coverage of a significant peripheral area around the vehicle. The cameras 608 may be used to provide images in electronic form to a transceiver 609a that is mounted either in the support rails 602 themselves or within the vehicle, as indicated by transceiver 609b. If a transceiver is mounted within the support feet 606 of the support rails 602, such as shown in FIG. 13 with receiver 320, then the transceiver may be powered by its own battery 316. In either event the transceiver 609 may transmit wireless images from each of the cameras to a user's cell phone (e.g., smartphone), as indicated by cell phone 614 shown in FIG. 19. A suitable application may be loaded into and stored on the user's cell phone 614 that allows the user to simply tap the screen 616, or to tap different arrows (not shown) presented on the screen, to toggle from one camera to another, and thus to view the image provided by each one of the cameras 608, as indicated for example at FIGS. 20 and 21. In this manner the user is able to quickly visualize virtually an entire peripheral area surrounding his/her vehicle as the user is approaching the vehicle, but still well before the user reaches and is standing close to the vehicle. It is also possible that the BLUETOOTH® wireless communications protocol could be used such that the user's cell phone receives a wireless signal from the vehicle's electronics and automatically begins running the camera application described above as soon as the user comes within a predetermined proximity of the vehicle (e.g., 30 feet) with his/her cell phone. It will be appreciated that the presentation of the video images provided by the cameras on the user's cell phone provides a significant security benefit to the user. An even further degree of security is provided if the cameras 608 are integrated in the support rails with a light transmitting element or other form of light component that automatically turns on either when the presence of the user's cell phone is sensed or when the user presses a button on his/her key FOB. With brief reference to FIG. 22, the images provided by the cameras 608 may also be fed to an in-dash display system 620 of the vehicle while the vehicle is moving so that the driver can be continuously comprised of the positions of other vehicles behind or adjacent his/her vehicle. This may significantly reduce and/or eliminate "blind spots" associated with the vehicle.

Example embodiments have been provided herein so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A vehicle article carrier system for carrying articles above an outer body surface of a vehicle, the system comprising:
   at least one support rail secured to the outer body surface, the support rail including:
   a support foot at each of its opposite ends, each said support foot being adapted to be secured to the outer body surface of the vehicle;
   a solar panel for collecting solar energy, the solar panel having a shape and contour generally matching a contour of an outer surface of one of the support feet and being integrated into a recess in said one of the support feet, to form an integral portion of said one of the support feet;
   a battery for storing electrical energy created using collected solar energy, the battery being disposed in the recess; and
   a light configured to be powered by the battery, the light forming an integral portion of the support rail.

2. The vehicle article carrier system of claim 1, wherein the solar panel comprises a layer of protective glass and a layer of solar film, the layer of protective glass being disposed over the layer of protective film.

3. The vehicle article carrier system of claim 1, further comprising a camera integrated into the support rail.

4. The vehicle article carrier system of claim 3, wherein each of the support feet include a camera integrated therein.

5. The vehicle article carrier system of claim 3, further comprising a transmitter for wirelessly transmitting images from the camera to a display component located inside the vehicle.

6. The vehicle article carrier system of claim 4, further comprising a second support rail having a pair of support feet, the support feet of the second support rail each including a camera therein, and wherein the cameras in each of the support feet of the support rail and the second support rail provide a 360 degree view around the vehicle.

7. A vehicle article carrier system for carrying articles above an outer body surface of a vehicle, the system comprising:
   at least one support rail secured to the outer body surface, the support rail including:
   a longitudinal portion having a support foot at each of its opposite ends, each said support foot being adapted to be secured to the outer body surface of the vehicle;
   a DC power source integrated into the support rail;
   a camera integrated into the support rail and powered by the DC power source; and
   the DC power source comprises a solar panel cell and a battery chargeable by the solar panel cell, the solar panel cell being integrated into a recess in the support foot of the at least one support rail and having a contour matching that of an outer surface of the support foot to form an appearance of an integral portion of the support foot.

8. The vehicle article carrier system of claim 7, further comprising a light generating element integrated into the support rail and powered by the DC power source.

9. The vehicle carrier system of claim 7, wherein the solar panel cell and the DC power source are disposed in the recess in one of the support feet.

10. The vehicle article carrier system of claim 8, wherein the light generating element is a DC powered light strip that extends within a channel along a major portion of a length of the support rail.

11. The vehicle article carrier system of claim 8, wherein the light generating element is a fiber optic cable that extends within a channel along a major portion of a length of the support rail.

12. The vehicle article carrier system of claim 7, further comprising a smartphone having a display screen, the smartphone being configured to wirelessly receive images from a transceiver associated with the vehicle article carrier system, which said images are obtained by the smartphone when the smartphone comes within a predetermined proximity to the vehicle.

13. A vehicle article carrier system for carrying articles above an outer body surface of a vehicle, the system comprising:
   at least one support rail secured to the outer body surface, the support rail including:
   a support foot at each of its opposite ends, each said support foot being adapted to be secured to the outer body surface of the vehicle;
   a solar panel cell for collecting solar energy which is integrated into at least one of the support feet and disposed within a recess formed in the at least one support foot, the solar panel cell further having a curvature in accordance with a contour of an outer surface of the at least one support foot so as to blend in with the at least one support foot;

a battery for storing electrical energy created using the collected solar energy, the battery disposed within the recess in the at least one support foot adjacent the solar panel cell;

a light configured to be powered by the battery, the light forming an integral portion of the support rail; and a camera integrated into one of the support rails and configured to be powered by the battery, for obtaining images looking in a first direction from the vehicle and wirelessly providing the images to a display system disposed inside the vehicle.

14. The system of claim 13, further comprising a transmitter integrated into one of the support rails for wirelessly transmitting the images from the camera to the display system.

15. The system of claim 13, further comprising an additional camera disposed in one of the support rails and arranged to obtain images looking in a second direction different than the first direction.

16. The system of claim 15, further comprising a smartphone for wirelessly receiving the images from the camera and displaying the images on a display of the smartphone when a user is outside of the vehicle but in proximity to the vehicle.

* * * * *